W. J. MATTHEWS.
TRACTION GRIPPING ATTACHMENT FOR WHEELS.
APPLICATION FILED JULY 12, 1913.

1,091,004.

Patented Mar. 24, 1914.

W. J. Matthews
Inventor

Witnesses by C. A. Snow & Co.
Attorneys

UNITED STATES PATENT OFFICE.

WILLIAM JOHN MATTHEWS, OF DETROIT, MICHIGAN.

TRACTION GRIPPING ATTACHMENT FOR WHEELS.

1,091,004.  Specification of Letters Patent.  Patented Mar. 24, 1914.

Application filed July 12, 1913. Serial No. 778,815.

*To all whom it may concern:*

Be it known that I, WILLIAM J. MATTHEWS, a citizen of the United States, residing at Detroit, in the county of Wayne and State of Michigan, have invented a new and useful Traction Gripping Attachment for Wheels, of which the following is a specification.

The present invention relates to improvements in traction gripping attachments for wheels, one object of the invention, being the provision of an adjustable and detachable means adapted to be connected to wheels, such for instance as the tractor wheels of an automobile when the same is stalled in a soft road and wherein the tire has insufficient gripping surface to propel the vehicle, the present device being readily attached to incase the tread portion of the tire and a portion of the circumference thereof, whereby when the traction strain is thrown upon the wheel, the present gripping device will grip the surface traversed and offer sufficient resistance thereto to assist in the propelling of the vehicle out of the mud, or rut.

A further object of the invention is the provision of a device of this character, which is preferably made of a plurality of hinged members connected together so as to accommodate tires of various circumferences and having means for detachably connecting the same so as to embrace the tread of the tire at the desired point and be held rigid thereto during the rotation of the wheel.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

Figure 1:
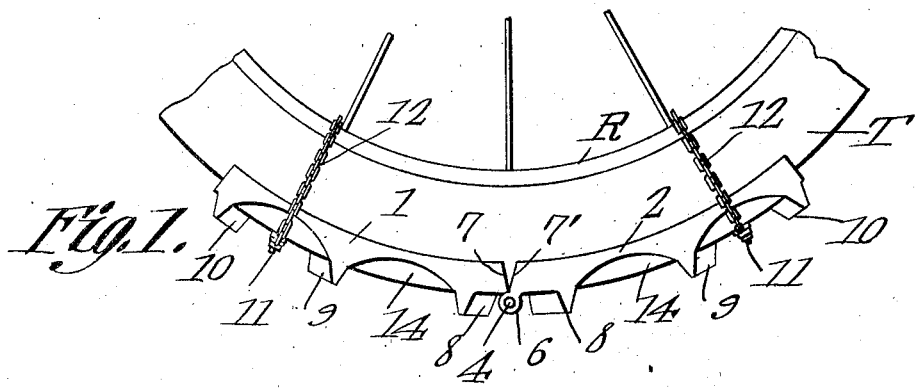
Figure 2:
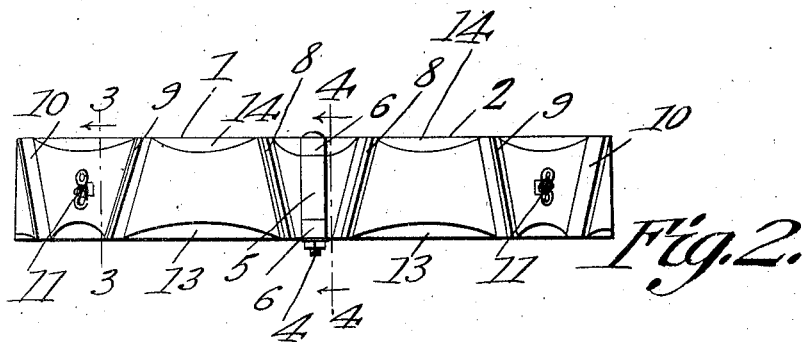
Figure 3:
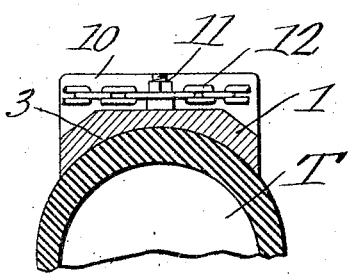
Figure 4:
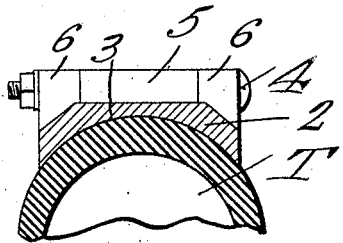

In the drawings Figure 1 is a side elevation of a portion of a wheel and tire with the present device attached thereto. Fig. 2 is a bottom plan view of the present device. Fig. 3 is a cross section taken on line 3—3 of Fig. 2 with a portion of the tire in section. Fig. 4 is a section taken on line 4—4 of Fig. 2 with a portion of the tire in section.

Referring to the drawings, the present device consists of two members 1 and 2, the inner faces 3 of which are curved to fit the transverse curvature of the tread portion of the tire T, as clearly illustrated in Figs. 3 and 4, and one member is provided with the central apertured lug 5 and the other member with the two spaced apertured lugs 6 for the reception of the hinging element or bolt 4, as clearly illustrated in Figs. 1, 2 and 4. By this means it will be seen that both members 1 and 2 may be flexed or swung to accommodate any diameter of tire, thus rendering it unnecessary to carry in stock more than one size of the present device. The meeting edges of the members at 7—7' are cut at a slight angle so that the same may be extended or contracted and still properly fit upon the tread of the tire. The outer surface of each member, as clearly illustrated, is provided with the angularly disposed gripping ribs 8, 9 and 10, there preferably being three to each member, but it is to be understood that there may be any number that will prove efficient. It is to be noted that the ribs are so disposed, as to alternate in their position of angularity and thus provide a means whereby when the device cuts into mud or other soft substance on the road, the outer surface of each member will readily clear itself so that the mud or other soft substance will not clog between the ribs.

In order to provide a means for attaching the present device about the tire T and rim R of the wheel, a lug or bolt 11 is carried by each member near the free end thereof and between the respective ribs 9 and 10 as clearly shown, and connected to each lug is a chain 12, which is disposed to surround the tire and rim as illustrated in Fig. 1 to thus hold the tractor device in place.

It will be noted that the face of each member 1 and 2 between the respective ribs has its edge curved as at 13 and 14, thus reducing the smooth traction space of the device, and also assisting in the easy withdrawal or movement of the tread surface thereof from the surface traversed while the peculiar arrangement of the ribs 8, 9 and 10 will produce the necessary gripping effect to prevent the whirling or rapid rotation of the wheel in soft surfaces as is incident in motor car traffic, where the road is muddy and full of ruts.

With the present device, when the wheel of the motor car has become stalled, it is simply necessary to attach the device so that the free end of one of the members will be slightly in advance of the rut, and then immediately the wheel is rotated in the desired direction, the present traction device will be brought into engagement with the surface either adjacent the edge of the rut or into the rut, producing the necessary gripping effect upon the surface traversed to propel the vehicle in the desired direction.

What is claimed is—

A device of this character, including two members, two transversely disposed apertured lugs carried at one end of one of the members and in spaced relation to each other, a single transversely disposed apertured lug carried at one end by the remaining member for axial alinement with the two apertured lugs of the first member, a bolt projecting through the three lugs and hingedly connecting the members together, said bolt and the lugs constituting a transversely disposed traction rib at the junction of the members, the inner face of both members being concaved to receive the tread surface of a tire, a plurality of transversely disposed ribs carried upon the outer face of each member, a chain attaching lug carried upon the outer face adjacent the free end of each member, and a chain connected to each lug for embracing the rim and tire of a wheel to secure the device in place, the ribs of each member being inclined relatively to the longitudinal length of the members and the edges of the member between the ribs being beveled.

In testimony that I claim the foregoing as my own, I have hereto affixed my signature in the presence of two witnesses.

WILLIAM JOHN MATTHEWS.

Witnesses:
   WILLIAM H. ROWE,
   EDWARD WARREN.